United States Patent
Wang et al.

(10) Patent No.: US 11,451,276 B2
(45) Date of Patent: Sep. 20, 2022

(54) METHOD AND APPARATUS FOR GENERATING SPREADING SEQUENCE CODEBOOKS

(71) Applicant: ZTE Corporation, Guangdong (CN)

(72) Inventors: Sha Wang, Shenzhen (CN); Yifei Yuan, Shenzhen (CN); Li Tian, Shenzhen (CN); Zhifeng Yuan, Shenzhen (CN); Wei Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 84 days.

(21) Appl. No.: 16/941,377

(22) Filed: Jul. 28, 2020

(65) Prior Publication Data
US 2020/0358499 A1 Nov. 12, 2020

Related U.S. Application Data

(63) Continuation of application No. PCT/CN2018/074457, filed on Jan. 29, 2018.

(51) Int. Cl.
*H04B 7/0456* (2017.01)
*H04L 27/26* (2006.01)
*H04W 72/04* (2009.01)

(52) U.S. Cl.
CPC ....... *H04B 7/0482* (2013.01); *H04L 27/2607* (2013.01); *H04W 72/0446* (2013.01); *H04W 72/0453* (2013.01)

(58) Field of Classification Search
CPC ... H04B 7/0482; H04L 27/2607; H04L 27/18; H04L 5/0053; H04W 72/0446; H04W 72/0453
See application file for complete search history.

(56) References Cited

U.S. PATENT DOCUMENTS

| | | |
|---|---|---|
| 2008/0025433 A1 | 1/2008 | Deguchi |
| 2015/0030093 A1 | 1/2015 | Kim |

(Continued)

FOREIGN PATENT DOCUMENTS

| | | |
|---|---|---|
| CN | 101729212 A | 6/2010 |
| CN | 105706406 A | 6/2016 |

(Continued)

OTHER PUBLICATIONS

Xia, Pengfei et al. ("Achieving the Welch Bound with Difference Sets", IEEE 0-7803-8874-7/05 ©2005 IEEE), (Year: 2005).*

(Continued)

*Primary Examiner* — Huy D Vu
*Assistant Examiner* — Robert Ma
(74) *Attorney, Agent, or Firm* — Foley & Lardner LLP

(57) ABSTRACT

A method and apparatus for generating and utilizing spreading sequence codebooks for a symbol-level sequence spreading is disclosed. In one embodiment, a method performed by a wireless communication device, comprising: receiving a first number from a wireless communication node; selecting a first spreading sequence codebook from at least one spreading sequence codebook; selecting a first spreading sequence from the first spreading sequence codebook according to the first number; and spreading data symbols according to the first spreading sequence, wherein the at least one spreading sequence codebook each comprises a plurality of spreading sequences configured based on one entry of a first sequence set after cyclic shifting operation, wherein the first sequence set before cyclic shifting operation is configured based on a second sequence set.

18 Claims, 10 Drawing Sheets

(56) References Cited

U.S. PATENT DOCUMENTS

2015/0381396 A1    12/2015  Chen et al.
2018/0337816 A1*   11/2018  Herath .................. H04L 5/0053
2019/0181993 A1*    6/2019  Lee ........................ H04L 27/18

FOREIGN PATENT DOCUMENTS

| CN | 106788861 A | 5/2017 |
| CN | 107104780 A | 8/2017 |
| CN | 107343321 A | 11/2017 |
| WO | WO-2008/024567 A1 | 2/2008 |
| WO | WO-2008/048056 A1 | 4/2008 |

OTHER PUBLICATIONS

International Search Report on PCT/CN2018/074457 dated Sep. 29, 2018 (3 pages).
First Office Action for CN Appl. No. 201880084966.4, dated May 18, 2021 (5 pages).

\* cited by examiner

| N | K | D | N | K | D |
|---|---|---|---|---|---|
| 7 | 3 | {1 2 4} | | | {1 11 121 8 88 37 9 99 25 69 94 103} |
| | | {3 5 6} | | | {1 11 121 10 110 13 27 31 75 68 83 115} |
| 13 | 4 | {0 1 3 9} | | | {1 11 121 16 43 74 40 41 52 60 128 78} |
| | | {0 7 8 11} | | | {1 11 121 18 65 50 29 53 51 45 96 125} |
| | | {0 2 5 6} | | | {2 22 109 3 33 97 17 54 62 20 87 26} |
| | | {0 4 12 10} | | | {2 22 109 5 55 73 16 43 74 18 65 50} |
| 11 | 6 | {0 2 6 7 8 10} | | | {2 22 109 15 32 86 23 120 123 80 82 104} |
| | | {0 1 3 4 5 9} | | | {2 22 109 36 130 100 58 106 102 59 117 90} |
| 31 | 6 | {1 5 25 11 24 27} | | | {3 33 97 16 43 74 24 131 111 27 31 75} |
| | | {1 5 25 17 23 22} | | | {3 33 97 23 120 123 47 118 101 48 129 89} |
| | | {2 10 19 3 15 13} | | | {3 33 97 30 64 39 71 116 79 81 93 92} |
| | | {2 10 19 17 23 22} | | | {4 44 85 6 66 61 34 108 124 40 41 52} |
| | | {3 15 13 4 20 7} | | | {4 44 85 10 110 13 15 32 86 36 130 100} |
| | | {4 20 7 6 30 26} | | | {4 44 85 27 31 75 30 64 39 46 107 113} |
| | | {6 30 26 8 9 14} | | | {4 44 85 47 118 101 67 72 127 71 116 79} |
| | | {8 9 14 12 29 21} | | | {5 55 73 12 132 122 59 117 90 81 93 92} |
| | | {11 24 27 16 18 28} | | | {5 55 73 34 108 124 67 72 127 80 82 104} |
| | | {12 29 21 16 18 28} | 133 | 12 | {5 55 73 40 41 52 45 96 125 71 116 79} |
| 15 | 8 | {3 6 7 9 11 12 13 14} | | | {6 66 61 9 99 25 29 53 51 60 128 78} |
| | | {6 12 4 3 2 9 1 8} | | | {6 66 61 15 32 86 17 54 62 48 129 89} |
| 57 | 8 | {0 19 1 7 49 23 47 44} | | | {6 66 61 45 96 125 46 107 113 69 94 103} |
| | | {0 19 2 14 41 10 13 34} | | | {8 88 37 12 132 122 68 83 115 80 82 104} |
| | | {0 19 2 14 41 15 48 51} | | | {8 88 37 17 54 62 60 128 78 81 93 92} |
| | | {0 19 3 21 33 8 56 50} | | | {8 88 37 20 87 26 30 64 39 67 72 127} |
| | | {0 19 4 28 25 5 35 17} | | | {9 99 25 10 110 13 59 117 90 80 82 104} |
| | | {0 19 5 35 17 6 42 9} | | | {9 99 25 48 129 89 67 72 127 81 93 92} |
| | | {0 19 8 56 50 22 40 52} | | | {10 110 13 24 131 111 29 53 51 47 118 101} |
| | | {0 19 11 20 26 16 55 43} | | | {12 132 122 18 65 50 23 120 123 58 106 102} |
| | | {0 19 11 20 26 24 54 36} | | | {12 132 122 30 64 39 34 108 124 45 96 125} |
| | | {0 19 12 27 18 29 32 53} | | | {15 32 86 46 107 113 58 106 102 68 83 115} |
| | | {0 19 23 47 44 30 39 45} | | | {16 43 74 23 120 123 29 53 51 34 108 124} |
| | | {0 19 29 32 53 31 46 37} | | | {17 54 62 36 130 100 40 41 52 69 94 103} |
| | | {0 38 1 7 49 5 35 17} | | | {18 65 50 20 87 26 27 31 75 47 118 101} |
| | | {0 38 1 7 49 24 54 36} | | | {20 87 26 48 129 89 58 106 102 69 94 103} |
| | | {0 38 2 14 41 31 46 37} | | | {24 131 111 36 130 100 46 107 113 71 116 79} |
| | | {0 38 3 21 33 31 46 37} | | | {24 131 111 59 117 90 60 128 78 68 83 115} |
| | | {0 38 4 28 25 11 20 26} | | | |
| | | {0 38 4 28 25 30 39 45} | | | |
| | | {0 38 6 42 9 16 55 43} | | | |
| | | {0 38 8 56 50 10 13 34} | | | |
| | | {0 38 10 13 34 12 27 18} | | | |
| | | {0 38 15 48 51 22 40 52} | | | |
| | | {0 38 16 55 43 23 47 44} | | | |
| | | {0 38 22 40 52 29 32 53} | | | |

| $x_1$ | $\frac{1}{\sqrt{3}}$ | $\frac{1}{\sqrt{3}}$ | $\frac{1}{\sqrt{3}}$ |
|---|---|---|---|
| $x_2$ | $\frac{1}{\sqrt{3}}e^{\frac{2\pi\sqrt{-1}}{7}}$ | $\frac{1}{\sqrt{3}}e^{\frac{4\pi\sqrt{-1}}{7}}$ | $\frac{1}{\sqrt{3}}e^{\frac{8\pi\sqrt{-1}}{7}}$ |
| $x_3$ | $\frac{1}{\sqrt{3}}e^{\frac{4\pi\sqrt{-1}}{7}}$ | $\frac{1}{\sqrt{3}}e^{\frac{8\pi\sqrt{-1}}{7}}$ | $\frac{1}{\sqrt{3}}e^{\frac{2\pi\sqrt{-1}}{7}}$ |
| $x_4$ | $\frac{1}{\sqrt{3}}e^{\frac{6\pi\sqrt{-1}}{7}}$ | $\frac{1}{\sqrt{3}}e^{\frac{12\pi\sqrt{-1}}{7}}$ | $-\frac{1}{\sqrt{3}}e^{\frac{3\pi\sqrt{-1}}{7}}$ |
| $x_5$ | $\frac{1}{\sqrt{3}}e^{\frac{8\pi\sqrt{-1}}{7}}$ | $\frac{1}{\sqrt{3}}e^{\frac{2\pi\sqrt{-1}}{7}}$ | $\frac{1}{\sqrt{3}}e^{\frac{4\pi\sqrt{-1}}{7}}$ |
| $x_6$ | $\frac{1}{\sqrt{3}}e^{\frac{10\pi\sqrt{-1}}{7}}$ | $\frac{1}{\sqrt{3}}e^{\frac{6\pi\sqrt{-1}}{7}}$ | $-\frac{1}{\sqrt{3}}e^{\frac{5\pi\sqrt{-1}}{7}}$ |
| $x_7$ | $\frac{1}{\sqrt{3}}e^{\frac{12\pi\sqrt{-1}}{7}}$ | $-\frac{1}{\sqrt{3}}e^{\frac{3\pi\sqrt{-1}}{7}}$ | $\frac{1}{\sqrt{3}}e^{\frac{6\pi\sqrt{-1}}{7}}$ |

| | | | | | | | | |
|---|---|---|---|---|---|---|---|---|
| $x_1$ | 0.3535+0i | 0.3535+0i | 0.3535+0i | 0.3535+0i | 0.3535+0i | 0.3535+0i | 0.3535+0i | 0.3535+0i |
| $x_2$ | 0.1092+0.3362i | -0.286+0.2078i | -0.345+0.0735i | -0.286+-0.207i | -0.036+-0.351i | 0.1092+-0.336i | 0.2365+-0.262i | 0.3229+-0.143i |
| $x_3$ | -0.286+0.2078i | 0.1092+-0.336i | 0.3229+-0.143i | 0.1092+0.3362i | -0.345+0.0735i | -0.286+-0.207i | -0.036+-0.351i | 0.2365+-0.262i |
| $x_4$ | -0.286+-0.207i | 0.1092+0.3362i | -0.286+0.2078i | 0.1092+-0.336i | 0.1092+0.3362i | -0.286+0.2078i | -0.286+-0.207i | 0.1092+-0.336i |
| $x_5$ | 0.1092+-0.336i | -0.286+-0.207i | 0.2365+-0.262i | -0.286+0.2078i | 0.3229+-0.143i | 0.1092+0.3362i | -0.345+0.0735i | -0.036+-0.351i |
| $x_6$ | 0.3535+-4.006i | 0.3535+-8.012i | -0.176+0.3061i | 0.3535+-2.597i | -0.176+-0.306i | 0.3535+-1.602i | -0.176+0.3061i | -0.176+-0.306i |
| $x_7$ | 0.1092+0.3362i | -0.286+0.2078i | 0.1092+-0.336i | -0.286+-0.207i | -0.286+0.2078i | 0.1092+-0.336i | 0.1092+0.3362i | -0.286+-0.207i |
| $x_8$ | -0.286+0.2078i | 0.1092+-0.336i | -0.036+-0.351i | 0.1092+0.3362i | 0.2365+0.2627i | -0.286+-0.207i | 0.3229+0.1438i | -0.345+-0.073i |
| $x_9$ | -0.286+-0.207i | 0.1092+0.3362i | -0.036+-0.351i | 0.1092+-0.336i | 0.2365+-0.262i | -0.286+0.2078i | 0.3229+-0.143i | -0.345+0.0735i |
| $x_{10}$ | 0.1092+-0.336i | -0.286+-0.207i | 0.1092+0.3362i | -0.286+0.2078i | -0.286+-0.207i | 0.1092+0.3362i | 0.1092+-0.336i | -0.286+0.2078i |
| $x_{11}$ | 0.3535+-8.012i | 0.3535+-1.602i | -0.176+-0.306i | 0.3535+-5.195i | -0.176+0.3061i | 0.3535+-3.204i | -0.176+-0.306i | -0.176+0.3061i |
| $x_{12}$ | 0.1092+0.3362i | -0.286+0.2078i | 0.2365+0.2627i | -0.286+-0.207i | 0.3229+0.1438i | 0.1092+-0.336i | -0.345+-0.073i | -0.036+0.3516i |
| $x_{13}$ | -0.286+0.2078i | 0.1092+-0.336i | -0.286+-0.207i | 0.1092+0.3362i | 0.1092+-0.336i | -0.286+-0.207i | -0.286+0.2078i | 0.1092+0.3362i |
| $x_{14}$ | -0.286+-0.207i | 0.1092+0.3362i | 0.3229+-0.143i | 0.1092+-0.336i | -0.345+0.0735i | -0.286+0.2078i | -0.036+0.3516i | 0.2365+0.2627i |
| $x_{15}$ | 0.1092+-0.336i | -0.286+-0.207i | -0.345+-0.073i | -0.286+0.2078i | -0.036+0.3516i | 0.1092+0.3362i | 0.2365+0.2627i | 0.3229+0.1438i |

FIG. 4D

METHOD AND APPARATUS FOR GENERATING SPREADING SEQUENCE CODEBOOKS

CROSS-REFERENCE TO RELATED APPLICATION

This application claims the benefit of priority under 35 U.S.C. § 120 as a continuation of PCT Patent Application No. PCT/CN2018/074457, filed on Jan. 29, 2018, the disclosure of which is incorporated herein by reference in its entirety.

TECHNICAL FIELD

This disclosure relates generally to wireless communications and, more particularly, to a method and apparatus for generating and utilizing spreading sequence codebooks for a symbol-level sequence spreading.

BACKGROUND

Over the past few decades, mobile communications have evolved from merely voice services to high-speed broadband data services. With further development of new types of services and applications, e.g. enhanced mobile broadband (eMBB), massive Machine-Type Communication (mMTC), Ultra Reliability Low Latency Communication (URLLC), etc, the demands for high-performance data transmission on mobile networks will continue to increase exponentially. Based on specific requirements in these emerging services, wireless communication systems should meet a variety of requirements, such as throughput, latency, data rate, capacity, reliability, link density, cost, energy consumption, complexity, and coverage.

Traditional methods which rely on random access and scheduled data transmission between a base station and a user terminal fail to provide satisfactory performance for the aforementioned growth in services due to limited equipment capacity, high latency, and high signaling overhead. In order to meet these demands for 5G/NR (New Radio) communication, a grant-free data transmission method based on competition is being developed. A grant-free data transmission is a method where a transmitting user terminal can perform an autonomous data transmission without transmitting a scheduling request signal to a base station or acquiring a dynamic grant signal from the base station. Advantages of the grant-free data transmission method includes reduced signaling overhead, reduced terminal power consumption, reduced latency, etc.

Grant-free methods can utilize either orthogonal or non-orthogonal resource allocation techniques. In an orthogonal resource allocation technique, although the resources themselves are orthogonal, different user terminals may randomly choose the same resources for data transmission, causing a "collisions." When a collision occurs, channel performance can be significantly affected. Therefore, orthogonal grant-free resource allocation schemes are not efficient in terms of usage of resources. On the other hand, non-orthogonal grant-free resource allocation schemes based on sequence spreading can process data on a transmitting user terminal and use advanced receivers on the base station, which can effectively handle scenarios such as multi-user overlap or collision without compromising the channel performance. For example, if data after modulation from the transmitting user terminal can be spread on the symbol-level by low-correlation spreading sequences, then even under situations of overlapped transmission on the same resources from multiple user terminals or different user terminals using the same spreading sequence, probabilities for collision can be significantly reduced. Furthermore, a low-correlation spreading sequence codebook with a large number of sequences can also reduce multi-user interference, enhance system capacity, and also reduce complexity of receivers on the base station. There is no satisfactory solution in existing literatures or existing technologies for configuring spreading sequence codebooks with low cross-correlation for non-orthogonal grant-free access.

SUMMARY

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In accordance with some embodiments, a method performed by a wireless communication node, includes: receiving a first number from a wireless communication node; selecting a first spreading sequence codebook from at least one spreading sequence codebook; selecting a first spreading sequence from the first spreading sequence codebook according to the first number; and spreading data symbols according to the first spreading sequence, wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set comprises at least one of the following, a first entry includes {1, 2, 4}, a second entry includes {0, 1, 3, 9}, a third entry includes {0 2, 6, 7, 8, 10}, a fourth entry includes {1, 5, 11, 24, 25, 27}, a fifth entry includes {3, 6, 7, 9, 11, 12, 13, 14}, a sixth entry includes {0, 1, 9, 23, 44, 47, 49}, and a seventh entry includes {1, 8, 9, 11, 25, 37, 69, 88, 94, 99, 103, 121}.

In further embodiments, a method performed by a wireless communication device, includes: selecting a first number for a wireless communication device; and transmitting the first number to the wireless communication device, wherein the first number is used by the wireless communication device to determine a first spreading sequence codebook from at least one spreading sequence codebook, to further select a first spreading sequence from the first spreading sequence codebook, and to further spread data symbols according to the first spreading sequence, wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set comprises at least one of the following, a first entry includes {1, 2, 4}, a second entry includes {0, 1, 3, 9}, a third entry includes {0 2, 6, 7, 8, 10}, a fourth entry includes {1, 5, 11, 24, 25, 27}, a fifth entry includes {3, 6, 7, 9, 11, 12, 13, 14}, a sixth entry includes {0, 1, 9, 23, 44, 47, 49}, and a seventh entry includes {1, 8, 9, 11, 25, 37, 69, 88, 94, 99, 103, 121}.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 3B illustrates extended sequence sets D at different N and K values, in accordance with some embodiments of the present disclosure.

FIG. 4B illustrates a spreading sequence codebook when K=3 and an extended sequence set D of {1, 2, 4} after cyclic shifting, in accordance with some embodiments of the present disclosure.

FIG. 4D illustrates a spreading sequence codebook when K=8 and an extended spreading sequence D of {3, 6, 7, 9, 11, 12, 13, 14} after cyclic shifting, in accordance with some embodiments of the present disclosure.

DETAILED DESCRIPTION

Figure 1A:
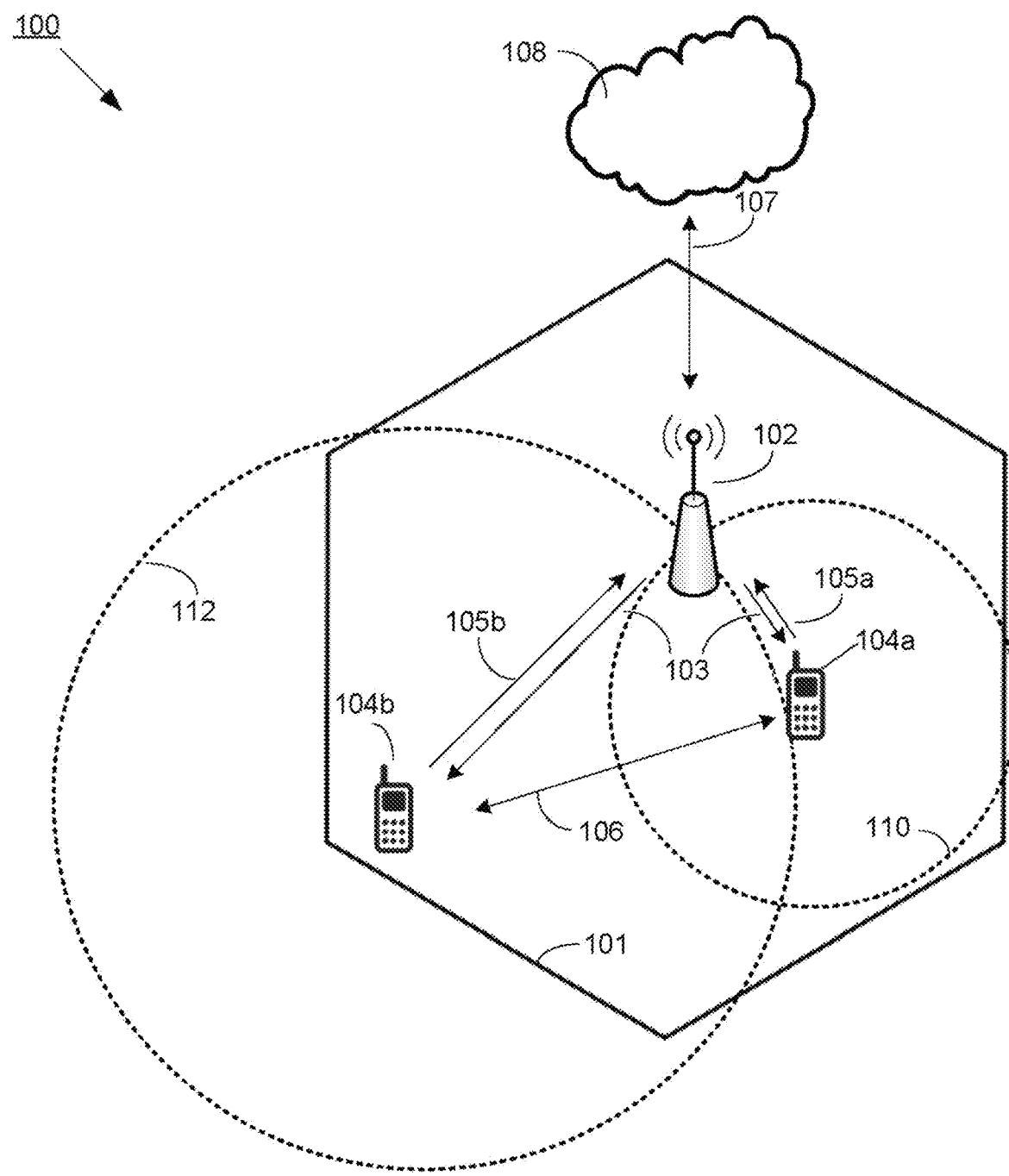
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104*a*, and a UE 104*b* (collectively referred to as UE's 104 herein). The BS 102 and the UE's 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. The UE 104*a* has a direct communication channel with the BS 102 operating at a first frequency f1 for downlink communication 103 and a second frequency f2 for uplink communication 105*a*. Similarly, the UE 104*b* also has a direct communication channel with the BS 102 operating at the first frequency f1 for downlink communication 103 and a third frequency f3 for uplink communication. In some embodiments, the second frequency f2 and the third frequency f3 are different from the first frequency f1. In some embodiments, the second frequency f2 and the third frequency f3 are different from each other. Therefore, the second frequency f2 and the third frequency f3 have different transmission characteristics, such as for example path loss, coverage, maximum transmission power, etc. In some embodiments, the bandwidth of the first frequency f1, the second frequency f2 and the third frequency f3 can be also different. In some embodiments, the second frequency f2 and the third frequency f3 may have different transmission characteristics on different bandwidth parts, such as for example path loss, coverage, maximum transmission power, etc. Although only 2 UE's 104 are shown in FIG. 1A, it should be noted that any number of UE's 104 can be included in the cell 101 and are within the scope of this invention. In some embodiments, the coverage of uplink communication 105b is larger than that of the uplink communication 105a, as indicated by dotted circles 112 and 110, respectively. The BS 102 is located at the intercept region of the coverage areas 110 and 112 in order for the BS 102 to perform uplink communication with the UE 104a and UE 104b in the cell 101.

When the UE 104b is at the extreme cell edge 101, e.g., with a longer distance between the BS 102 and UE 104b, path loss becomes significant, so the UE 104b will transmit at a maximum power over a long distance at the third frequency f3. As a result, the data rate is relatively low between BS 102 and UE 104b in this case. As the UE 104 moves closer to the BS 102 (i.e., UE 104a), the path loss decreases and the signal level at the BS 102 increases, thus the SNR improves. In response, the BS 102 instructs the UE 104 to reduce power on the second frequency f2 to minimize interference to other UE's and/or the BS 102.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the BS 102, which obtains its own synchronization timing from the core network 108 through an interne time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
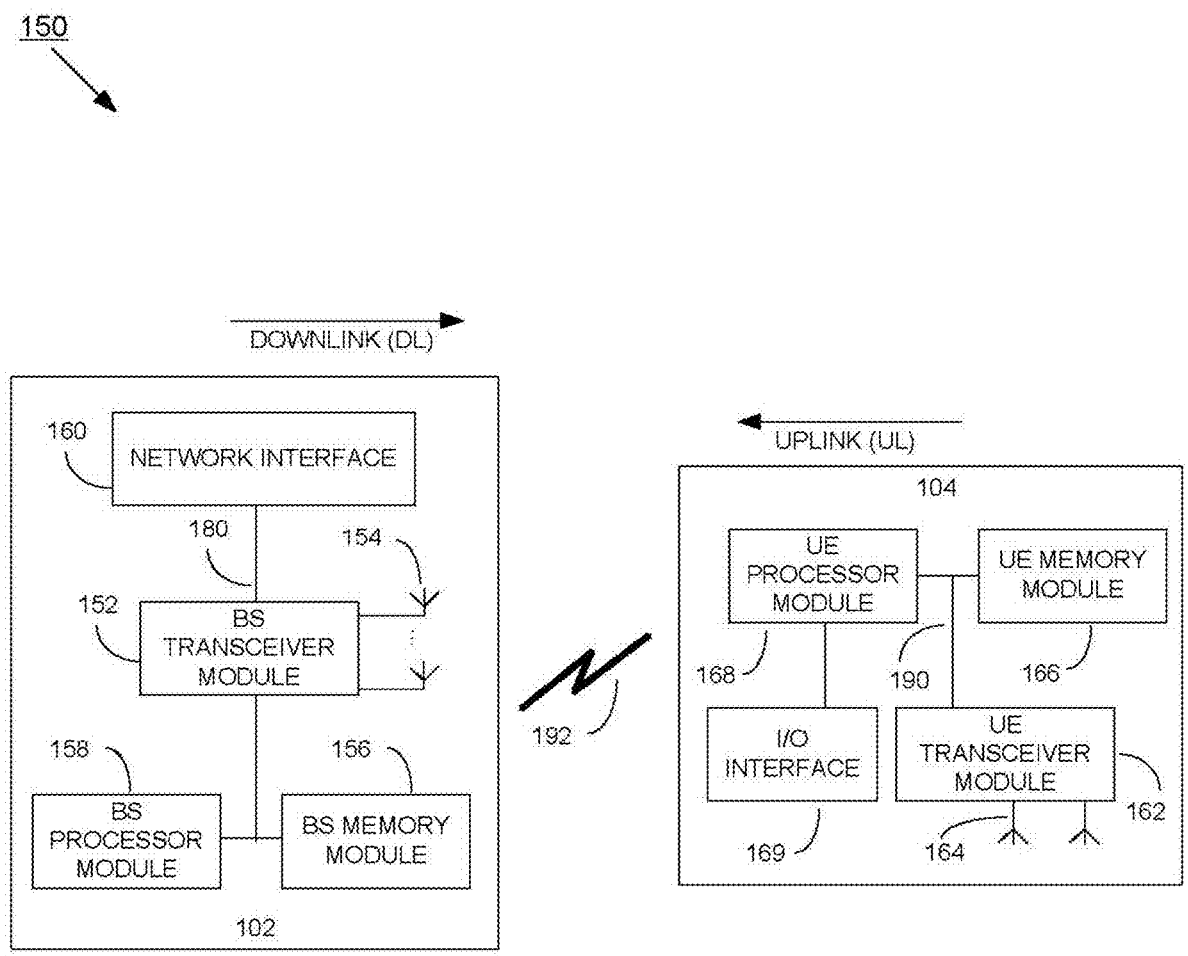
FIG. 1B illustrates a block diagram of an exemplary wireless communication system for a slot structure information indication, in accordance with some embodiments of the present disclosure.

FIG. 1B illustrates a block diagram of an exemplary wireless communication system 150 for a slot structure information indication, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and at least one UE 104. The BS 102 includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and a I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UE's via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UE's (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UE's, e.g., between 104a and 104b. As described in further detail below, the UE 104 supports sidelink communications with other UE's as well as downlink/uplink communications between the BS 102 and the UE 104. As discussed above, sidelink communication allows the UE's 104a and 104b to establish a direct communication link with each other, or with other UE's from different cells, without requiring the BS 102 to relay data between UE's.

Figures 2, 3A:
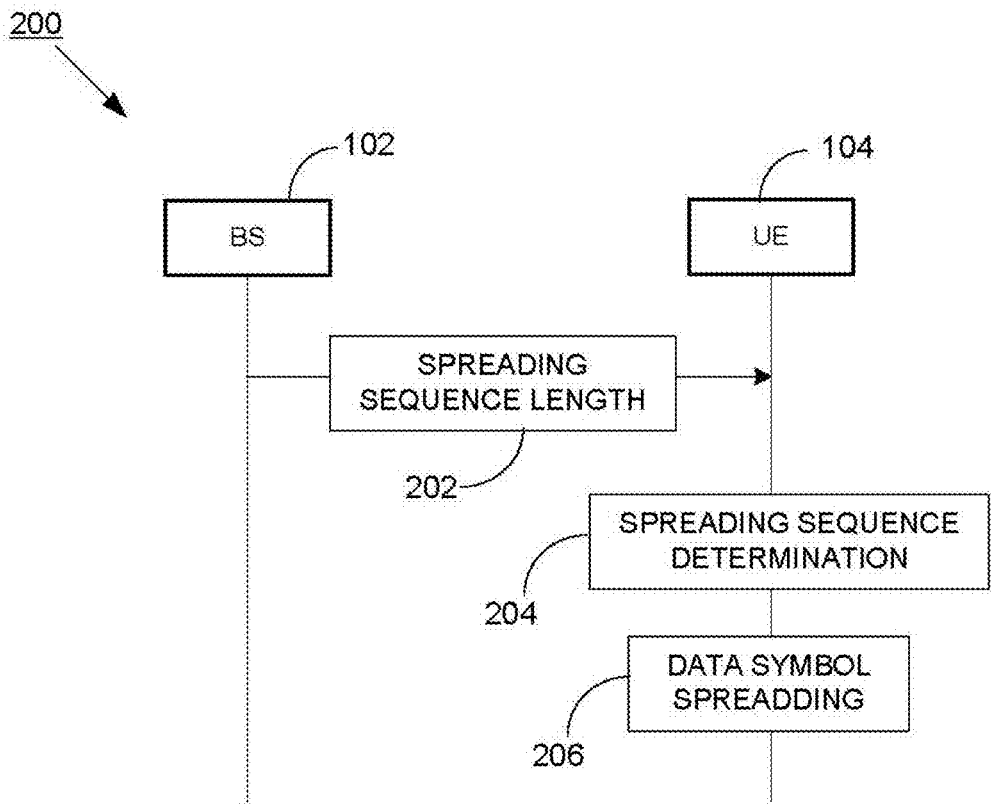
FIG. 2 illustrates a method of symbol-level sequence spreading on a transmitting UE using a spreading sequence selected from a spreading sequence codebook, in accordance with some embodiments of the present disclosure.
FIG. 3A illustrates a basic sequence set D at different N and K values, in accordance with some embodiments of the present disclosure.

FIG. 2 illustrates a method 200 of symbol-level sequence spreading on a transmitting UE 104 using a spreading sequence selected from a spreading sequence codebook, in accordance with some embodiments of the present disclosure. It is understood that additional operations may be provided before, during, and after the method 200 of FIG. 2, and that some other operations may be omitted or only briefly described herein.

The method 200 starts with operation 202 in which a BS 102 configures a spreading sequence length to a UE 104, according to some embodiments. In some embodiments, the spreading sequence length K is randomly selected the BS 102 and transmitted to all the UE's 104 in the cell through a system information. In some embodiments, at least one spreading sequence codebook is preconfigured in the BS/UE memory modules 156/166 (FIG. 1B). In some embodiments, the spreading sequence length K is selected from at least one available K value which corresponds to the at least one spreading sequence codebook. In some embodiments, UE's 104 perform a cell searching during which a cell ID and a frame starting location are obtained. A K value can then be obtained through PDCCH (Physical Downlink Control Channel) or PBCH (Physical Broadcast Channel) decoding on the UE side. In some embodiments, during initial access a UE 104, after receiving a command from the BS 102 to transmit a scheduled PRACH (Physical random access channel) to obtain an indication of a scheduled PRACH, transmits a SRS (Sounding Reference Signal) message through the uplink PRACH to the BS 102.

The method 200 continues with operation 204 in which the UE 104 determines a spreading sequence for data spreading based on the K value received from the BS 102, according to some embodiments. Specifically, the UE 104 first based on the decoded K value determines a spreading sequence codebook from the at least one sequence codebook that are preconfigured in the system information. Each of the at least one spreading sequence codebook comprises a plurality of spreading sequences $x_i$, according to various embodiments, wherein i is a positive integer and can be 1, 2, ..., N. In some embodiments, each spreading sequence $x_i$ in a spreading sequence codebook of the at least one spreading sequence codebook comprises K elements and can be calculated based on the equation below $$x_i = \frac{1}{\sqrt{K}} \chi_i(d_l) = \frac{1}{\sqrt{K}} (\chi_i(d_1), \chi_i(d_2), \ldots \chi_i(d_K)) =$$
$$\frac{1}{\sqrt{K}} \left( e^{\frac{2\pi\sqrt{-1}\,d_1(i-1)}{N}}, e^{\frac{2\pi\sqrt{-1}\,d_2(i-1)}{N}}, \ldots e^{\frac{2\pi\sqrt{-1}\,d_K(i-1)}{N}} \right)$$

Wherein K comprises at least one of the following values: 3, 4, 6, 8, and 12, 1 is positive integer and can be 1, 2, ..., K. In some embodiments, each elements $x_{i,l}$ is a complex number. In some embodiments, N can be configured by K based on $$N = \frac{K^2 - K}{\lambda} + 1,$$

wherein λ is a positive integer. In some embodiments, N comprises at least one of the following values: 7, 13, 11, 31, 15, 7, and 133. In some embodiments, the at least one spreading sequence codebook is selected from 7 spreading sequence codebooks corresponding to the 7 N values. Furthermore, $d_j=\{d_1, d_2, \ldots, d_K\}$ is one entry from an extended sequence set D after some cyclic shifting operation, wherein D is a difference set and N is the order of a group G and equals to the number of element in the group G, wherein G={0, 1, 2, ..., N−1}. If non-zero elements in G, i.e., {1, 2, ..., N−1} can be represented by $(d_K-d_j)$mod N, wherein k≠l, D={$d_1, d_2, \ldots, d_K$} is a (N, K, λ) difference set and D has λ forms. In some embodiments, the extended sequence set D before cyclic shifting operation is configured from a basic sequence set D, as further discussed in detail below.

FIG. 3A illustrates a basic sequence set D at different N and K values, in accordance with some embodiments of the present disclosure. In the illustrated embodiment, column 302 shows 7 N values which are 7, 13, 11, 31, 15, 7, and 133, column 304 comprises 5 K values which are 3, 4, 6, 8, 12, and column 306 shows 7 entries in the basic sequence set D. Each of the 7 entries comprises K elements. Specifically, when N=7 and K=3, a first entry 310 comprises 3 elements including 1, 2, and 4; when N=13 and K=4, a second entry 312 comprises 4 elements including 0, 1, 3, and 9; when N=11 and K=6, a third entry 314 comprises 6 elements including 0, 2, 6, 7, 8, and 10; when N=31 and K=6, a fourth entry 316 comprises 6 elements including 1, 5, 11, 24, 25, and 27; when N=15 and K=8, a fifth entry 318 comprises 8 elements including 3, 6, 7, 9, 11, 12, 13, and 14; when N=57 and K=8, a sixth entry 320 comprises 8 elements including 0, 1, 7, 9, 23, 24, 44, 47, and 49; and when N=133 and K=12, a seventh entry 322 comprises 8 elements including 1, 8, 9, 11, 25, 37, 69, 88, 94, 99, 103, and 121.

In some embodiments, at least one extended sequence set D can be determined by multiplying each element in [1:N] with the at least one entry of the basic sequence set D (shown FIG. 3A), and then take mod N to all the entries. For example, when K=3, N=7, and the entry of the basic sequence set D=[1, 2, 4], the extended sequence set D before cyclic shifting operation can be configured based on D=mod ([1, 2, 3, 4, 5, 6, 7]*[1, 2, 4], 7), according to some embodiments.

FIG. 3B illustrates extended sequence sets D at different N and K values, in accordance with some embodiments of the present disclosure. In the illustrated embodiment, column 302 shows 7 N values which are 7, 13, 11, 31, 15, 7, and 133, column 304 comprises 5 K values which are 3, 4, 6, 8, and 12, and column 306 shows 7 extended sequence sets D. Each of the 7 extended sequence sets D comprises K elements. Specifically, when N=7 and K=3, a first extended sequence set D 340 comprises 2 entries and each entry comprise 3 elements. The first entry of the first extended sequence set D 340 comprises 1, 2, and 4, and the second entry of the first extended sequence set D 340 comprises 3, 5, and 6. When N=13 and K=4, a second extended sequence set D 342 comprises 4 entries and each entry comprises 4 elements. The first entry of the second extended sequence set D 342 comprises 0, 1, 3, and 9, the second entry of the second extended sequence set D 342 comprises 0, 7, 8, 11, the third entry of the second extended sequence set D 342 comprises 0 2, 5, and 6; and the fourth entry of the second extended sequence set D 342 comprises 0, 4, 12, and 10. When N=11 and K=6, a third extended sequence set D 344 comprises 2 entries and each entry comprises 6 elements. The first entry of the third extended sequence set D 344 comprises 0, 2, 6, 7, 8 and 10; and the second entry of the third extended sequence set D 344 comprises 0, 1, 3, 4, 5, 9. Furthermore, when N=31 and K=6, a fourth extended sequence set D 346 comprises 10 entries and each entry comprises 6 elements. The first entry of the fourth extended sequence set D 346 comprises 1, 5, 25, 11, 24, and 27; the second entry of the fourth extended sequence set D 346 comprises 1, 5, 25, 17, 23, and 22; the third entry of the fourth extended sequence set D 346 comprises 2, 10, 19, 3, 15, and 13; the fourth entry of the fourth extended sequence set D 346 comprises 2, 10, 19, 17, 23, and 22; the fifth entry of the fourth extended sequence set D 346 comprises 3, 15, 13, 4, 20, and 7; the sixth entry of the fourth extended sequence set D 346 comprises 4, 20, 7, 6, 30, and 26; the seventh entry of the fourth extended sequence set D 346 comprises 6, 30, 26, 8, 9 and 14; the eighth entry of the fourth extended sequence set D 346 comprises 8, 9, 14, 12, 29, and 21; the ninth entry of the fourth extended sequence set D 346 comprises 11, 24, 27, 16, 18, and 28; and the tenth entry of the fourth extended sequence set D 346 comprises 12, 29, 21, 16, 18, and 28, in accordance with some embodiments.

Referring to FIG. 3B again, in the illustrated embodiments, when N=15 and K=8, a fifth extended sequence set D 348 comprises 2 entries and each entry comprises 8 elements. The first entry of the fifth extended sequence set D 348 comprises 3, 6, 7, 9, 11, 12, 13, and 14; and the second entry of the fifth extended sequence set D 348 comprises 6, 12, 4, 3, 2, 9, 1, and 8. When N=57 and K=8, a sixth extended sequence set of D 350 comprises 24 entries and each entry comprise 8 elements. The first entry of the sixth extended sequence set D 350 comprises 0, 19, 1, 7, 49, 23, 47, and 44; the second entry of the sixth extended sequence set D 350 comprises 0, 19, 2, 14, 41, 10, 13,and 34; the third entry of the sixth extended sequence set D 350 comprises 0, 19, 2, 14, 41, 15, 48, and 51; the fourth entry of the sixth extended sequence set D 350 comprises 0, 19, 3, 21, 33, 8, 56, and 50; the fifth entry of the sixth extended sequence set D 350 comprises 0, 19, 4, 2, 25, 5, 35, and 17; the sixth entry of the sixth extended sequence set D 350 comprises 0, 19, 5, 35, 17, 6, 42, and 9; the seventh entry of the sixth extended sequence set D 350 comprises 0, 19, 8, 56, 50, 22, 40, and 52; the eighth entry of the sixth extended sequence set D 350 comprises 0, 19, 11, 20, 26, 16, 55, and 43; the ninth entry of the sixth extended sequence set D 350 comprises 0, 19, 11, 20, 26, 24, 54, and 36; the tenth entry of the sixth extended sequence setD 350 comprises 0, 19, 12, 27, 18, 29, 32, and 53; the eleventh entry of the sixth extended sequence set D 350 comprises 0, 19, 23, 47, 44, 30, 39, and 45; the twelves entry of the sixth extended sequence set D 350 comprises 0, 19, 29, 32, 53, 31, 46, and 37; the thirteenth entry of the sixth extended sequence set D 350 comprises 0, 38, 1, 7, 49, 5, 35, and 17; the fourteenth entry of the sixth extended sequence set D 350 comprises 0, 38, 1, 7, 49, 24, 54, and 36; the fifteenth entry of the sixth extended sequence set D 350 comprises 0, 38, 2, 14, 41, 31, 46, and 37; the sixteenth entry of the sixth extended sequence set D 350 comprises 0, 38, 3, 21, 33, 31, 46, and 37; the seventeenth entry of the sixth extended sequence set D 350 comprises 0, 38, 4, 28, 25, 11, 20, and 26; the eighteenth entry of the sixth extended sequence setD 350 comprises 0, 38, 4, 28, 25, 30, 39, and 45; the nineteenth entry of the sixth extended sequence set D 350 comprises 0, 38, 6, 42, 9, 16, 55, and 43; the twentieth entry of the sixth extended sequence set D 350 comprises 0, 38, 8, 56, 50, 10, 13, and 34; the twenty first entry of the sixth extended sequence set D 350 comprises 0, 38, 10, 13, 34, 12, 27, and 18; the twenty second entry of the sixth extended sequence set D 350 comprises 0, 38, 15, 48, 51, 22, 40, and 52; the twenty third entry of the sixth extended sequence set D 350 comprises 0, 38, 16, 55, 43, 23, 47, and 44; and the twenty fourth entry of the sixth extended sequence set D 350 comprises 0, 38, 22, 40, 52, 29, 32, and 53, in accordance with some embodiments.

Referring to FIG. 3B again, in the illustrated embodiments, when N=133 and K=12, a seventh extended sequence set D 352 comprises 36 entries and each entry comprises 12 elements. The first entry of the seventh extended sequence set D 352 comprises 1, 11, 121, 8, 88, 37, 9, 99, 25, 69, 94, and 103; the second entry of the seventh extended sequence set D 352 comprises 1, 11, 121, 10, 110, 13, 27, 31, 75, 68, 83, and 115; the third entry of the seventh extended sequence set D 352 comprises 1, 11, 121, 16, 43, 74, 40, 41, 52, 60, 128, and 78; the fourth entry of the seventh extended sequence set D 352 comprises 1, 11, 121, 18, 65, 50, 29, 53, 51, 45, 96, and 125; the fifth entry of the seventh extended sequence set D 352 comprises 2, 22, 109, 3, 33, 97, 17, 54, 62, 20, 87, and 26; the sixth entry of the seventh extended sequence set D 352 comprises 2, 22, 109, 5, 55, 73, 16, 43, 74, 18, 65, and 50; the seventh entry of the seventh extended sequence set D 352 comprises 2, 22, 109, 15, 32, 86, 23, 120, 123, 80, 82, and 104; the eighth entry of the seventh extended sequence set D 352 comprises 2, 22, 109, 36, 130, 100, 58, 106, 102, 59, 117, and 90; the ninth entry of the seventh extended sequence set D 352 comprises 3, 33, 97, 16, 43, 74, 24, 131, 111, 27, 31, and 75; the tenth entry of the seventh extended sequence set D 352 comprises 3, 33, 97, 23, 120, 123, 47, 118, 101, 48, 129, and 89; the eleventh entry of the seventh extended sequence set D 352 comprises 3, 33, 97, 30, 64, 39, 71, 116, 79, 81, 93, and 92; the twelfth entry of the seventh extended sequence set D 352 comprises 4, 44, 85, 6, 66, 61, 34, 108, 124, 40, 41, and 52; the thirteenth entry of the seventh extended sequence setD 352 comprises 4, 44, 85, 10, 110, 13, 15, 32, 86, 36, 130, and 100; the fourteenth entry of the seventh extended sequence set D 352 comprises 4, 44, 85, 27, 31, 75, 30, 64, 39, 46, 107, and 113; the fifteenth entry of the seventh extended sequence set D 352 comprises 4, 44, 85, 47, 118, 101, 67, 72, 127, 71, 116, and 79; the sixteenth entry of the seventh extended sequence setD 352 comprises 5, 55, 73, 12, 132, 122, 59, 117, 90, 81, 93, and 92; the seventeenth entry of the seventh extended sequence set D 352 comprises 5, 55, 73, 34, 108, 124, 67, 72, 127, 80, 82, and 104; the eighteenth entry of the seventh extended sequence set D 352 comprises 5, 55, 73, 40, 41, 52, 45, 96, 125, 71, 116, and 79; the nineteenth entry of the seventh extended sequence set D 352 comprises 6, 66, 61, 9, 99, 25, 29, 53, 51, 60, 128, and 78; the twentieth entry of the seventh extended sequence set D 352 comprises 6, 66, 61, 15, 32, 86, 17, 54, 62, 48, 129, and 89; the twenty first entry of the seventh extended sequence set D 352 comprises 6, 66, 61, 45, 96, 125, 46, 107, 113, 69, 94, and 103; the twenty second entry of the seventh extended sequence setD 352 comprises 8, 88, 37, 12, 132, 122, 68, 83, 115, 80, 82, and 104; the twenty third entry o of the seventh extended sequence set D 352 comprises 8, 88, 37, 17, 54, 62, 60, 128, 78, 81, 93, and 92; the twenty fourth entry of the seventh extended sequence set D 352 comprises 8, 88, 37, 20, 87, 26, 30, 64, 39, 67, 72, and 127; the twenty fifth entry of the seventh extended sequence set D 352 comprises 9, 99, 25, 10, 110, 13, 59, 117, 90, 80, 82, and 104; the twenty sixth entry of the seventh extended sequence set D 352 comprises 9, 99, 25, 48, 129, 89, 67, 72, 127, 81, 93, and 92; the twenty seventh entry of the seventh extended sequence set D 352 comprises 10, 110, 13, 24, 131, 111, 29, 53, 51, 47, 118, and 101; the twenty eighth entry of the seventh extended sequence setD 352 comprises 12, 132, 122, 18, 65, 50, 23, 120, 123, 58, 106, and 102; the twenty ninth entry of the seventh extended sequence set D 352 comprises 12, 132, 122, 30, 64, 39, 34, 108, 124, 45, 96, and 125; the thirtieth entry of the seventh extended sequence setD 352 comprises 15, 32, 86, 46, 107, 113, 58, 106, 102, 68, 83, and 115; the thirty first entry of the seventh extended sequence set D 352 comprises 16, 43, 74, 23, 120, 123, 29, 53, 51, 34, 108, and 124; the thirty second entry of the seventh extended sequence setD 352 comprises 17, 54, 62, 36, 130, 100, 40, 41, 52, 69, 94, and 103; the thirty third entry of the seventh extended set of D 352 comprises 18, 65, 50, 20, 87, 26, 27, 31, 75, 47, 118, and 101; the thirty fourth entry of the seventh extended sequence set D 352 comprises 20, 87, 26, 48, 129, 89, 58, 106, 102, 69, 94, and 103; the thirty fifth entry of the seventh extended sequence set D 352 comprises 24, 131, 111, 36, 130, 100, 46, 107, 113, 71, 116, and 79; the thirty sixth entry of the seventh extended sequence set D 352 comprises 24, 131, 111, 59, 117, 90, 60, 128, 78, 68, 83, and 115, in accordance with some embodiments.

In some embodiments, the BS 102 also collects information from all the UE's 104 in the cell that are active, according to some embodiments. During this process, when a new UE 104 joins the cell, the new UE 104 sends a Probe message to the BS 102 through channels such as PRACH (Physical Random Access Channel) The BS 102 calculates a number of total active UE's 104 in the cell and transmits this number of total active UE's 104 (i.e., X) in the cell to all the UE's 104. In some embodiments, each active UE's 104 randomly selects one spreading sequence from the selected spreading sequence book based on the received K value from the BS 102. In some embodiments, X entries from the selected spreading sequence codebook are randomly selected by active UE's 104. In some embodiments, any two spreading sequences for two UE's 104 can the same or different.

The method 200 continues with operation 206 in which the UE 104 performs a symbol-level sequence spreading based on the selected spreading sequence and prepare the data from modulation for transmission, according to some embodiments. In some embodiments, the symbols are OFDM (orthogonal frequency-division multiplexing) symbols after some modulation operation. In some embodiments, the modulation operation used can be a quadrature amplitude modulation (QAM), which offers advantages over other forms of data modulation such as PSK (phase-shifting keying). In some embodiments, the modulation comprises a high order modulation, such as 256 QAM, or 512 QAM or 1024 QAM, which provides a theoretically higher efficiency. In some embodiments, the transmitting data is also processed after CRC (cyclic redundancy check) and channel coding before modulation. In some embodiments, this symbol-level sequence spreading is performed by multiplying each OFDM symbol with the selected spreading sequence for the UE 104 based on $$S_K \times \begin{bmatrix} x_1 \\ \vdots \\ x_N \end{bmatrix} = \begin{bmatrix} S_K x_1 \\ \vdots \\ S_K x_N \end{bmatrix}$$

wherein $S_k$ is a OFDM symbol and $[x_1, \ldots, x_N]$ is a spreading sequence selected by a UE 104. In some embodiments, this symbol-level sequence spreading process can be configured in the time domain or in the frequency domain, as further discussed in detail below.

Figure 4A:
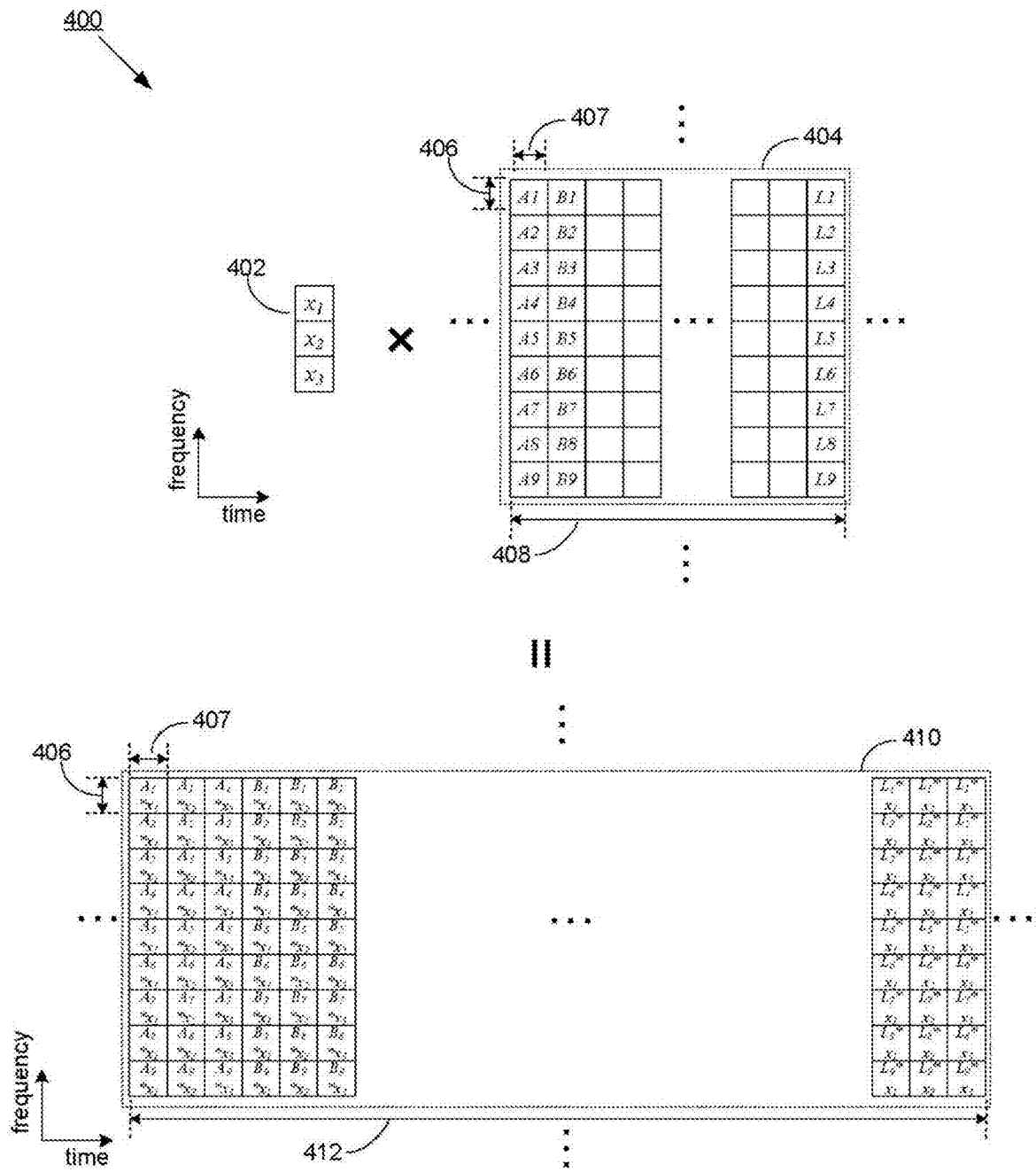
FIG. 4A illustrates a symbol-level sequence spreading process in the time domain using a spreading sequence when K=3, in accordance with some embodiments of the present disclosure.

FIG. 4A illustrates a symbol-level sequence spreading process 400 in the time domain using a spreading sequence when K=3, in accordance with some embodiments of the present disclosure. In case of time-domain spreading, each of the transmitting data symbols 404 after modulation from a UE 104 is spread in the time domain by the selected spreading sequence 402 from the selected spreading sequence codebook based on the K value. In some embodiments, the spreading sequence 402 is one entry of the selected spreading sequence codebook and has 3 elements, i.e., $x_1$, $x_2$, and $x_3$, when K=3. In some embodiments, the transmitting data symbols 404 occupies 108 research elements (RE) in 12 columns in the time domain and 9 rows in the frequency domain. In some embodiments, the transmitting data symbols 404 occupies a time range 408. Each transmitting data symbol in 404, which occupies 1 RE covering a frequency period 406 and a time period 407, is then spread in the frequency domain by the spreading sequence 402. The transmitting data symbols from the UE 104 after spreading then occupies 3 RE's. Therefore, after spreading, the transmitting data symbols 410 occupy a time range 412 which is 3 times wider than the time range 408 that the original transmitting data symbols 404 occupies, while keeping the occupancy of resources in the frequency domain constant.

FIG. 4B illustrates a spreading sequence codebook 415 when K=3 and an extended sequence set D of {1, 2, 4} after cyclic shifting is, in accordance with some embodiments of the present disclosure. In some embodiments, the spreading sequence 402 in FIG. 4A is selected from one entry of the spreading sequence codebook 415. When a K value of 3 is received by the UE 104 from the BS 102, a spreading sequence codebook 415 can be then selected by the UE 104. In some embodiments, the spreading sequence codebook 415 based on the method described above comprises 7 spreading sequences and each spreading sequence comprise 3 elements. A first spreading sequence $x_1$ of the spreading sequence codebook 415 comprises $1/\sqrt{3}$, $1/\sqrt{3}$, and $1/\sqrt{3}$; a second spreading sequence $x_2$ of the spreading sequence codebook 415 comprises $$e^{2\pi\sqrt{-1}/7}/\sqrt{3},$$
$$e^{4\pi\sqrt{-1}/7}/\sqrt{3}, \text{ and}$$
$$e^{8\pi\sqrt{-1}/7}/\sqrt{3};$$

a third spreading sequence $x_3$ of the spreading sequence codebook 415 comprises $$e^{4\pi\sqrt{-1}/7}/\sqrt{3},$$
$$e^{8\pi\sqrt{-1}/7}/\sqrt{3}, \text{ and}$$
$$e^{2\pi\sqrt{-1}/7}/\sqrt{3};$$

a fourth spreading sequence $x_4$ of the spreading sequence codebook 415 comprises $$e^{6\pi\sqrt{-1}/7}/\sqrt{3},$$
$$e^{12\pi\sqrt{-1}/7}/\sqrt{3}, \text{ and}$$
$$-e^{3\pi\sqrt{-1}/7}/\sqrt{3};$$

a fifth spreading sequence $x_5$ of the spreading sequence codebook 415 comprises $$e^{8\pi\sqrt{-1}/7}/\sqrt{3},$$

$$e^{2\pi\sqrt{-1}/7}/\sqrt{3}, \text{ and}$$

$$e^{4\pi\sqrt{-1}/7}/\sqrt{3};$$

a sixth spreading sequence $x_6$ of the spreading sequence codebook 415 comprises $$e^{10\pi\sqrt{-1}/7}/\sqrt{3},$$

$$e^{6\pi\sqrt{-1}/7}/\sqrt{3}, \text{ and}$$

$$-e^{5\pi\sqrt{-1}/7}/\sqrt{3};$$

and a seventh spreading sequence $x_7$ of the spreading sequence codebook 415 comprises $$e^{12\pi\sqrt{-1}/7}/\sqrt{3},$$

$$-e^{3\pi\sqrt{-1}/7}/\sqrt{3}, \text{ and}$$

$$e^{6\pi\sqrt{-1}/7}/\sqrt{3}.$$

Figure 4C:
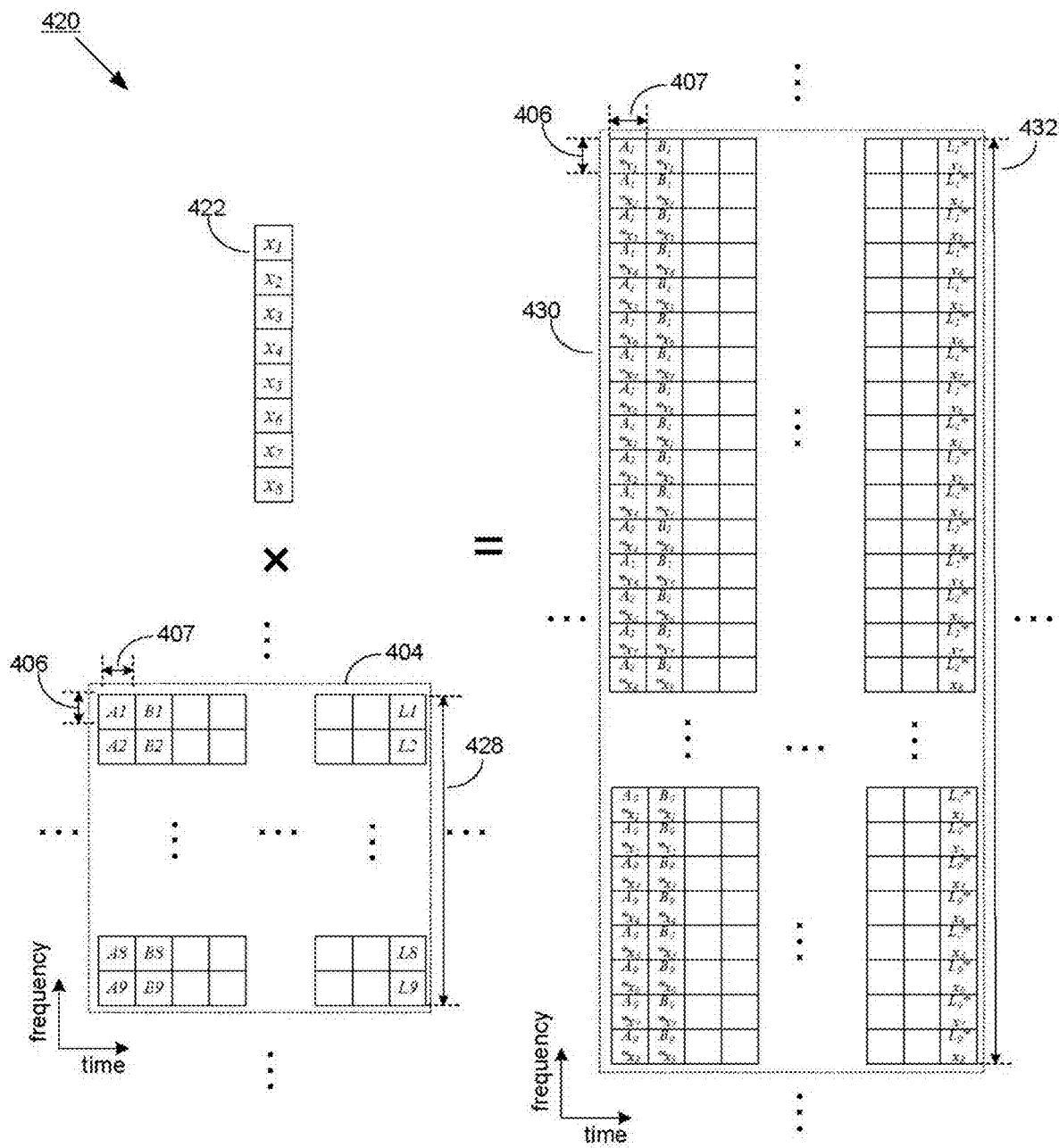
FIG. 4C illustrates a symbol-level sequence spreading process in the frequency domain using a spreading sequence when K=8, in accordance with some embodiments of the present disclosure.

FIG. 4C illustrates a symbol-level sequence spreading process 420 in the frequency domain using a spreading sequence when K=8, in accordance with some embodiments of the present disclosure. In case of frequency-domain spreading, each of the transmitting data symbols 404 of UE 104 after modulation is spread in the frequency domain by the selected spreading sequence 422 from the selected spreading sequence codebook based on the K value. In some embodiments, the spreading sequence 422 is one entry of the selected spreading sequence codebook and has 8 elements, i.e., $x_1$, $x_2$, $x_3$, $x_4$, $x_5$, $x_6$, $x_7$, and $x_8$, when K=8. In some embodiments, the transmitting data symbols 404 occupies 108 research elements (RE) in 12 columns in the time domain and 9 rows in the frequency domain. In some embodiments, the transmitting data symbols 404 occupies a frequency range 428. Each transmitting data symbol which occupies 1 RE covering a frequency period 406 and a time period 407 is then spread in the frequency domain by the spreading sequence 422. Each of the transmitting data symbols after spreading then occupies 8 RE's. Therefore, after spreading, the transmitting data symbols 430 occupy a frequency range 432 that is 8 times wider than the frequency range 428 that the original transmitting data symbols 404 occupies, while keeping the occupancy of resources in the time domain constant.

FIG. 4D illustrates a spreading sequence codebook 425 when K=8 and an extended spreading sequence D after cyclic shifting is {3, 6, 7, 9, 11, 12, 13, 14}, in accordance with some embodiments of the present disclosure. In some embodiments, the spreading sequence 422 is selected from one spreading sequence of the spreading sequence codebook 425. When a K value of 8 is received by the UE 104 from the BS 102, a spreading sequence codebook 425 is then selected by the UE 104. In some embodiments, the spreading sequence codebook 425 based on the method described above comprises 15 spreading sequences (N=15) and each spreading sequence comprise 8 elements (K=8). Specifically, a first spreading sequence $x_1$ of the spreading sequence codebook 425 comprises 0.3535+0i, 0.3535+0i, 0.3535+0i, 0.3535+0i, 0.3535+0i, 0.3535+0i, 0.3535+0i, and 0.3535+0i; a second spreading sequence $x_2$ of the spreading sequence codebook 425 comprises 0.1092+0.3362i, 0.286+0.2078i, 0.345+0.0735i, 0.286+0.207i, 0.036+0.351i, 0.1092+0.336i, 0.2365+0.262i, and 0.3229+0.143i; a third spreading sequence $x_3$ of the spreading sequence codebook 425 comprises −0.286+0.2078i, 0.1092+−0.336i 0.3229+−0.143i, 0.1092+0.3362i, −0.345+0.0735i, −0.286+−0.207i, −0.036+−0.351i, and 0.2365+−0.262i; a fourth spreading sequence $x_4$ of the spreading sequence codebook 425 comprises: −0.286+−0.207i, 0.1092+0.3362i, −0.286+0.2078i, 0.1092+−0.336i, 0.1092+0.3362i, −0.286+0.2078i, −0.286+−0.207i, and 0.1092+−0.336i; a fifth spreading sequence $x_5$ of the spreading sequence codebook 425 comprises: 0.1092+−0.336i, −0.286+−0.207i, 0.2365+−0.262i, −0.286+0.2078i, 0.3229+−0.143i, 0.1092+0.3362i, −0.345+0.0735i, and −0.036+−0.351i; a sixth spreading sequence $x_6$ of the spreading sequence codebook 425 comprises: 0.3535+−4.006i, 0.3535+−8.012i, −0.176+0.3061i, 0.3535+−2.597i, −0.176+−0.306i, 0.3535+−1.602i, −0.176+0.3061i, and −0.176+−0.306i; a seventh spreading sequence $x_7$ of the spreading sequence codebook 425 comprises: 0.1092+0.3362i, −0.286+0.2078i, 0.1092+−0.336i, −0.286+−0.207i, −0.286+0.2078i 0.1092+−0.336i, 0.1092+0.3362i, and −0.286+−0.207i; a eighth spreading sequence $x_8$ of the spreading sequence codebook 425 comprises: −0.286+0.2078i, 0.1092+−0.336i, −0.036+0.3516i, 0.1092+0.3362i, 0.2365+0.2627i, −0.286+−0.207i, 0.3229+0.1438i, and −0.345+−0.073i; a ninth spreading sequence $x_9$ of the spreading sequence codebook 425 comprises: −0.286+−0.207i, 0.1092+0.3362i, −0.036+−0.351i, 0.1092+−0.336i, 0.2365+−0.262i, −0.286+0.2078i, 0.3229+−0.143i, and −0.345+0.0735i; a tenth spreading sequence $x_{10}$ of the spreading sequence codebook 425 comprises: 0.1092+−0.336i, −0.286+−0.207i, 0.1092+0.3362i, −0.286+0.2078i, −0.286+−0.207i, 0.1092+0.3362i, 0.1092+−0.336i, and −0.286+0.2078i; an eleventh spreading sequence $x_{11}$ of the spreading sequence codebook 425 comprises: 0.3535+−8.012i, 0.3535+−1.602i, −0.176+−0.306i, 0.3535+−5.195i, −0.176+0.3061i, 0.3535+−3.204i, −0.176+−0.306i, and −0.176+0.3061i; a twelfth spreading sequence $x_{12}$ of the spreading sequence codebook 425 comprises: 0.1092+0.3362i, −0.286+0.2078i, 0.2365+0.2627i, −0.286+−0.207i, 0.3229+0.1438i, 0.1092+−0.336i, −0.345+−0.073i, and −0.036+0.3516i; a thirteenth spreading sequence $x_{13}$ of the spreading sequence codebook 425 comprises: −0.286+0.2078i, 0.1092+−0.336i, −0.286+−0.207i, 0.1092+0.3362i, 0.1092+−0.336i, −0.286+−0.207i, −0.286+0.2078i, and 0.1092+0.3362i; a fourteenth spreading sequence $x_{14}$ of the spreading sequence codebook 425 comprises: −0.286+−0.207i, 0.1092+0.3362i, 0.3229+0.1438i, 0.1092+−0.336i, −0.345+−0.073i, −0.286+0.2078i, −0.036+0.3516i, and 0.2365+0.2627i; and a fifteenth spreading sequence $x_{15}$ of the spreading sequence codebook 425 comprises: 0.1092+−0.336i, −0.286+−0.207i, −0.345+−0.073i, −0.286+0.2078i, −0.036+0.3516i, 0.1092+0.3362i, 0.2365+0.2627i, and 0.3229+0.1438i, in accordance with some embodiments.

Figure 5:
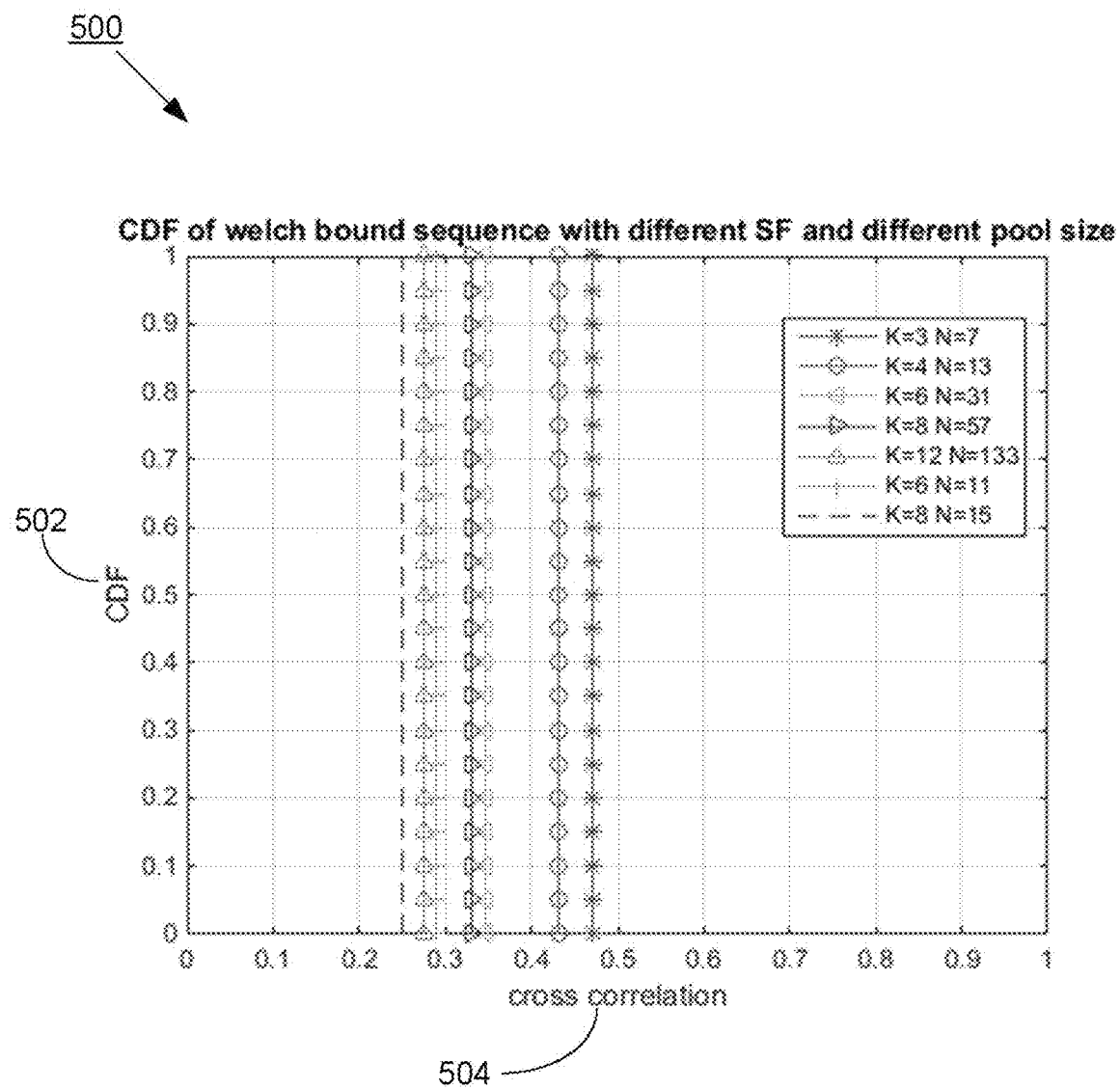
FIG. 5 illustrates a simulation result showing a cumulative distribution function (CFD) as a function of cross correlation values of spreading sequences in spreading sequence codebooks at different N and K values, in accordance with some embodiments of the present disclosure.

FIG. 5 illustrates a simulation result 500 showing a cumulative distribution function (CFD) as a function of cross correlation values of spreading sequences in spreading sequence codebooks at different N and K values, in accordance with some embodiments of the present disclosure. The cross correlation values of any two spreading sequences in a spreading sequence codebook at defined K and N values is independent of the spreading sequence and are constant. In some embodiments, the cross correlation value is defined as, $\sqrt{(N-K)/[K(N-1)]}$. Specifically, the cross-correlation values of any two spreading sequences in a spreading sequence codebook are 0.4714 when K=3 and N=7, 0.4330 when K=4 and N=13; 0.3727 when K=6 and N=31; 0.3307 when K=8 and N=57; 0.2764 when K=12 and N=133; 0.2886 when K=6 and N=11; and 0.25 when K=8 and N=15. The variance of the cross correlation values are 0, according to the illustrated embodiments.

Figure 6:
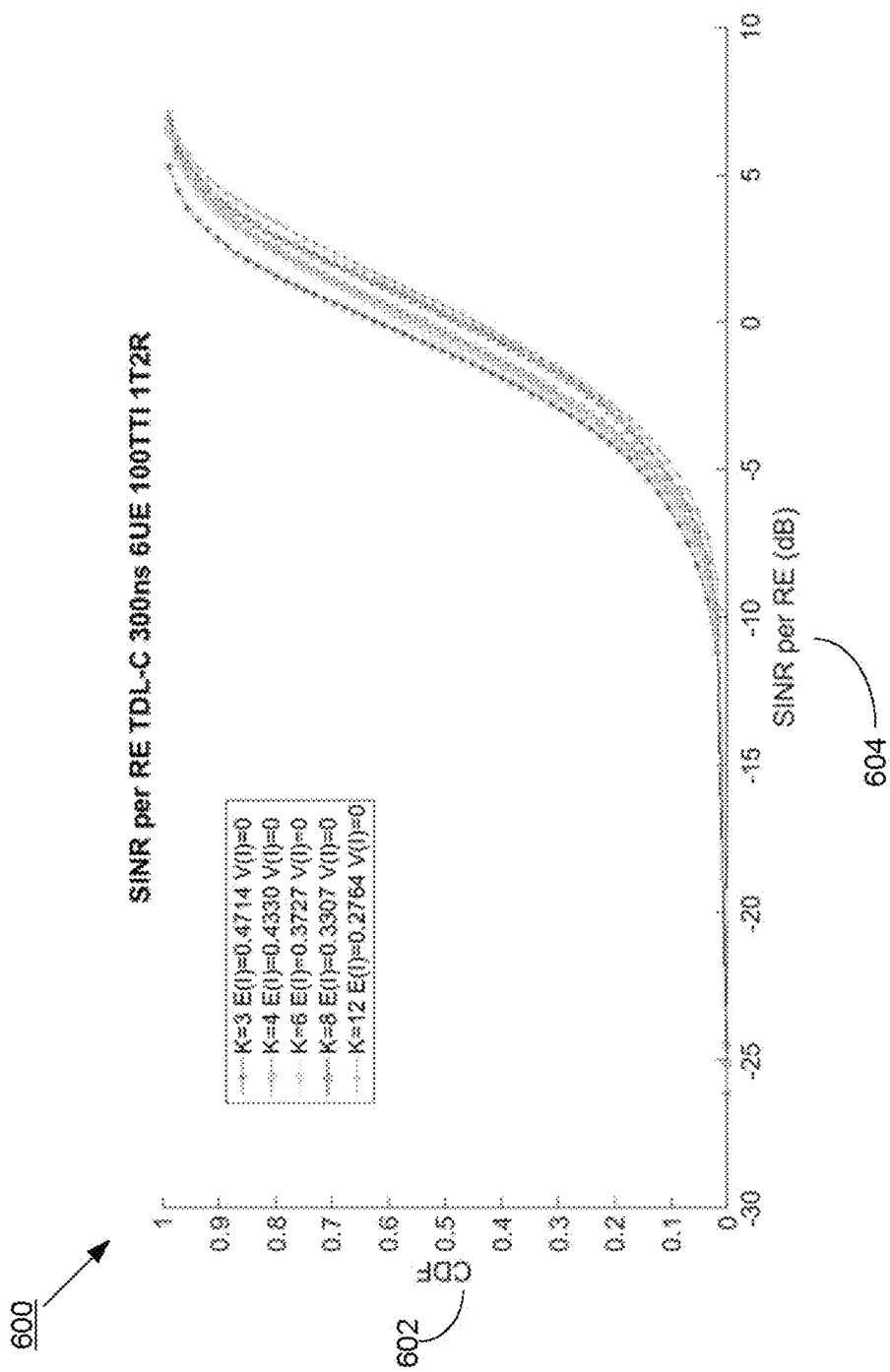
FIG. 6 illustrates a simulation result showing a cumulative distribution function (CFD) as function of signal-to-interference-plus-noise ratio (SINR) per resource element in various spreading sequence codebooks, in accordance with some embodiments of the present disclosure.

FIG. 6 illustrates a simulation result 600 showing a cumulative distribution function (CFD) as function of signal-to-interference-plus-noise ratio (SINR) per resource element in various spreading sequence codebooks, in accordance with some embodiments of the present disclosure. In some embodiments, assuming there are N non-orthogonal UE's 104 sharing the resource group with a spreading factor of K, and also assuming there are R antenna interfaces on the BS 102 receiving signals, the signal received on the R antenna is defined as $y_l = \Sigma_{i=1}^{N} \hat{h}_{l,i} x_{l,i} + n_l$ wherein $y_k$ is the received symbol vector on the $l^{th}$ RE. In some embodiments, $y_k$ has a size of KR×1. Assuming $S_l = [S_{1,l}, S_{2,l}, \ldots, S_{N,l}]$ are transmitting symbol which has a size of N×1, according to some embodiments. $n_l$ is a white noise with a power of $\sigma^2$, and $\hat{h}_{l,i}$ is configured based on $\hat{h}_{l,i} = (\hat{h}_{l,i,1}, \hat{h}_{l,i,2}, \ldots, \hat{h}_{l,i,R})^T$, wherein $\hat{h}_{l,i,R} = \sqrt{P_{l,i}} h_{l,i,r} x_i = A_{l,i,r} x_i$, wherein $x_i$ is a spreading sequence and has a size of K×1, $\hat{h}_{l,i}$ is an effective channel of the $i^{th}$ UE 104, $P_{l,i}$ is the transmission power, and $h_{l,i,r}$ is channel impulse response on the receiving antenna R. Therefore, a weight of a linear MMSE (minimum mean-squared-error) receiver is configured based on $w_i = R_{z,i}^{-1} \hat{h}_{l,i}$, which has a covariance defined as $R_{z,i}$ defined as $R_{z,i} \Sigma_{m \neq i}^{N} \hat{h}_{l,m} \hat{h}_{l,m} + \sigma^2 1_{KR}$. The SINR of the $i^{th}$ linear MMSE UE 104 is thus defined based on $SINR_{l,i} = \hat{h}_{l,i} \cdot w_i = \hat{h}_{l,i} R_{z,i}^{-1} \hat{h}_{l,i} = \hat{h}_{l,i} (\Sigma_{m \neq i}^{N} \hat{h}_{l,m} \hat{h}_{l,m} + \sigma^2 1_{KR})^{-1} \hat{h}_{l,i}$. In the illustrated embodiment in FIG. 6, E(I) is the cross correlation value, and V(I) is the variance of the cross correlation value. In some embodiments, assumptions used in the simulations include 6 UE's 104, 1 antenna on each UE 104, 2 antennas on the BS 102, TDL-C channel, number of simulation frames 100 TTI, and SINR=0. As shown in FIG. 6, CDF values 602 for five different K values (3, 4, 6, 8 and 12) approach unity after SINR 604 is higher than 10 dB (decibels). E(I) and V(I) values are consistent with values shown in FIG. 5. In the illustrated embodiment in FIG. 6, the CDF vs. SINR curves shift to the right with the reducing E(I) values. The curves from right to the left in FIG. 6 are when E(I)=0.4714, 0.4330, 0.3727, 0.3307 and 0.2764, according to the embodiment.

The present method demonstrates various embodiments of a symbol-level sequence spreading method which is advantageous. For example, when different UE's 104 select and use the same spreading sequence from the selected spreading sequence codebook for sequence spreading and the transmitting data symbols from different UE's 104 are transmitted on the same resource groups in the time-frequency domain, data symbols from different UE's 104 can still be separated by the BS 102. Since there are a large amount of the spreading sequences in a spreading sequence codebook having small cross correlation values, probability of collision, i.e., different UE's 104 select the same spreading sequence, is low, which allows a larger number of UE's 104 that can be supported by a BS 102 compared to other non-orthogonal sequence spreading methods. Furthermore, the present method provides an effective solution to problems such as multi-user interference. As discussed in FIG. 5, the multi-user interference (MUI) is a statistic value defined only by N and K, which in turn facilitates the design and construction of receivers on the BS 102 in contrast with other type of non-orthogonal sequence spreading method. Variance of the interference is only affected by the number of UE's 104 and channels. Finally, the method provides a lower error symbol rate due to the lower cross correlation value and thus higher SINR.

In some embodiments, the BS 102 receives spread transmitting data symbols from the UE 104, in accordance with some embodiments. The BS 102 further derives a bit sequence from each UE 104 and each UE 104 is expecting an RAR (Resource Allocation Request) from the BS 102 based on the bit sequence. In some embodiments, SIC (Successive Interference Cancellation) technology can be used in multi-user detection, in which signal is reconstructed after being successfully decoded by the BS 102, during which the spreading sequence is canceled from the spread transmitting data symbols. The remaining signal is then further demodulated. In some embodiments, one of the steps during the reconstruction is to re-spread the bit sequence based on the original spreading sequence that is selected by each UE 104.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, comprising:
receiving a first number from a wireless communication node;
selecting a first spreading sequence codebook from at east one spreading sequence codebook;
selecting a first spreading sequence from the first spreading sequence codebook according to the first number
spreading data symbols according to the first spreading sequence,
wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set Comprises at least one of the following,
a third entry comprising {0, 2, 6, 7, 8, 10}, a fifth entry comprising {3, 6, 7, 9,11, 12, 13, 14}, a sixth entry comprising {0, 1, 7, 9, 23, 44, 47, 49} and a seventh entry comprising {1, 8, 9, 11, 25, 37, 69, 88, 94, 99, 103, 121},
wherein the first sequence set before cyclic shifting can be determined by taking a modN to a third sequence set, wherein the third sequence set is obtained by multiplying each element in [1:N] with each entry of the second sequence set, wherein N is a total number of spreading sequences in one of the at least one spreading sequence codebook.

2. The method of claim 1, wherein the plurality of spreading sequence $x_i$ is configured based on $$x_i = \frac{1}{\sqrt{K}} \chi_i(d_l) = \frac{1}{\sqrt{K}} (\chi_i(d_1), \chi_i(d_2), \ldots \chi_i(d_K)) = \frac{1}{\sqrt{K}} \left( e^{\frac{2\pi\sqrt{-1} d_1(i-1)}{N}}, e^{\frac{2\pi\sqrt{-1} d_2(i-1)}{N}}, \ldots e^{\frac{2\pi\sqrt{-1} d_K(i-1)}{N}} \right)$$

wherein the plurality of spreading sequences $x_i$ each comprises a plurality of complex numbers and i is 1, 2, . . . N, $d_l$ is one entry of the first sequence set after cyclic shifting, wherein l is a positive integer and is 1, 2, . . . K, wherein K is the length of the entry of the first sequence set and is one of the following 3, 4, 6, 8, 12, and N is one of the following 7, 13, 11, 31, 15, 57 and 133.

3. The method of claim 1, wherein the first number is a spreading sequence length and is obtained by PDCCH (Physical Downlink Control Channel) decoding on the wireless communication device.

4. The method of claim 1, wherein the first number is randomly selected from at least one K value corresponding to the at least one spreading sequence codebook.

5. The method of claim 1, wherein N is determined based on $$N = \frac{K^2 - K}{\lambda} + 1$$

wherein K is the length of the entry of the first sequence set and $\Delta$ is a positive integer.

6. The method of claim 1, wherein cross-correlation values between two spreading sequences in the first spreading sequence codebook are equal and are determined based $$|\langle x_j, x_k \rangle|_{j \neq k} = \sqrt{\frac{N-K}{K(N-1)}}$$

wherein K is the length of the entry of the first sequence set.

7. The method of claim 1, wherein the spreading data symbols according to the first spreading sequence $x_j$ is configured based on $$S_k \times X_j$$

wherein $S_k$ is a OFDM (orthogonal frequency-division multiplexing) symbol after modulation and $x_j$ comprises K elements.

8. The method of claim 5, wherein the data symbol is spread in one of the following: time domain and frequency domain.

9. The method of claim 1, further comprising:
receiving a second number from the wireless communication node, wherein the second number is a number of active wireless communication devices in a cell communicating with the wireless communication node.

10. The method of claim 7, wherein the active wireless communication devices each is configured with one spreading sequence from the first spreading sequence codebook.

11. A method performed by a wireless communication node, comprising:
selecting a first number for a wireless communication device; and
transmitting the first number to the wireless communication device;
wherein the first number is used by the wireless communication device to determine a first spreading sequence codebook from at least one spreading sequence codebook, to further select a first spreading sequence from the first spreading sequence codebook, and to further spread data symbols according to the first spreading sequence,
wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set comprises at least one of the following,
a third entry comprising {0, 2, 6, 7, 8, 10}, a fifth entry comprising {3, 6, 7, 9,11, 13, 13,1.4 a sixth entry comprising {0, 1, 7, 9, 23, 44, 47, 49} and a seventh entry comprising {1, 8, 9,11, 25, 37, 69, 88, 94, 99, 103, 121),
wherein the first sequence set before cyclic shifting can be determined by taking a modN to a third sequence set, wherein the third sequence set is obtained by multiplying each element in [1:N] with each entry of the second sequence set, wherein N is a total number of spreading sequences in one of the at least one spreading sequence codebook.

12. The method of claim 11, wherein the plurality of spreading sequence xi is configured based on $$x_i = \frac{1}{\sqrt{K}} \chi_i(d_l) = \frac{1}{\sqrt{K}}(\chi_i(d_1), \chi_i(d_2), \ldots \chi_i(d_K)) =$$
$$\frac{1}{\sqrt{K}}\left(e^{\frac{2\pi\sqrt{-1}\,d_1(i-1)}{N}}, e^{\frac{2\pi\sqrt{-1}\,d_2(i-1)}{N}}, \ldots e^{\frac{2\pi\sqrt{-1}\,d_K(i-1)}{N}}\right)$$

wherein the plurality of spreading sequences xi each comprises a plurality of complex numbers and i is 1, 2, ... N, $d_l$ is one entry of the first sequence set after cyclic shifting, wherein l is a positive integer and is 1, 2, ... K, wherein K is the length of the entry of the first sequence set and is one of the following 3, 4, 6, 8, 12, and N is one of the following 7, 13, 11, 31, 15, 57 and 133.

13. The method of claim 11, wherein the first number K is a spreading sequence length and is obtained by PDCCH (Physical Downlink Control Channel) decoding on the wireless communication device.

14. The method of claim 11, wherein the first number is randomly selected from at least one K value corresponding to the at least one spreading sequence codebook.

15. The method of claim 11, wherein N is determined based on $$N = \frac{K^2 - K}{\lambda} + 1$$

wherein K is the length of the entry of the first sequence set and $\Delta$ is a positive integer.

16. The method of claim 11, wherein cross-correlation values between two spreading sequences in the first spreading sequence codebook are equal and are determined based on $$|\langle x_j, x_k \rangle|_{j \neq k} = \sqrt{\frac{N-K}{K(N-1)}}$$

wherein K is the length of the entry of the first sequence set.

17. A wireless communications apparatus comprising a processor, wherein the processor is configured to:
receive, via a receiver, a first number from a wireless communication node;
select a first spreading sequence codebook from at least one spreading sequence codebook;
select a first spreading sequence from the first spreading sequence codebook according to the first number; and
spread data symbols according to the first spreading sequence, wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set comprises at least one of the following, a third entry comprising {0, 2, 6, 7, 8, 10}, a fifth entry comprising {3, 6, 7, 9, 11, 12, 13, 14}, a sixth entry comprising {0, 1, 7, 9, 23, 44, 47, 49} and a seventh entry comprising {1, 8, 9, 11, 25, 37, 69, 88, 94, 99, 103, 121}, wherein the first sequence set before cyclic shifting can be determined by taking a modN to a third sequence set, wherein the third sequence set is obtained by multiplying each element in [1:N] with each entry of the second sequence set, wherein N is a total number of spreading sequences in one of the at least one spreading sequence codebook.

18. A non-transitory computer-readable medium having stored thereon computer-executable instructions, that, when executed by a processor, cause the processor to:
    receive, via a receiver, a first number from a wireless communication node;
    select a first spreading sequence codebook from at least one spreading sequence codebook;
    select a first spreading sequence from the first spreading sequence codebook according to the first number; and
    spread data symbols according to the first spreading sequence, wherein the at least one spreading sequence codebook each comprises a plurality of spreading sequences configured based on one entry of a first sequence set after cyclic shifting operation, wherein the first sequence set before cyclic shifting operation is configured based on a second sequence set, wherein the second sequence set comprises at least one of the following, a third entry comprising {0, 2, 6, 7, 8, 10}, a fifth entry comprising {3, 6, 7, 9, 11, 12, 13, 14}, a sixth entry comprising {0, 1, 7, 9, 23, 44, 47, 49} and a seventh entry comprising {1, 8, 9, 11, 25, 37, 69, 88, 94, 99, 103, 121}, wherein the first sequence set before cyclic shifting can be determined by taking a modN to a third sequence set, wherein the third sequence set is obtained by multiplying each element in [1:N] with each entry of the second sequence set, wherein N is a total number of spreading sequences in one of the at least one spreading sequence codebook.

* * * * *

UNITED STATES PATENT AND TRADEMARK OFFICE
CERTIFICATE OF CORRECTION

| | | |
|---|---|---|
| PATENT NO. | : 11,451,276 B2 | Page 1 of 1 |
| APPLICATION NO. | : 16/941377 | |
| DATED | : September 20, 2022 | |
| INVENTOR(S) | : Sha Wang et al. | |

It is certified that error appears in the above-identified patent and that said Letters Patent is hereby corrected as shown below:

In the Claims

In Claim 1, Column 20, Line 23, please delete "number" and insert -- number; and --

In Claim 1, Column 20, Line 32, please delete "Comprises" and insert -- comprises --

In Claim 1, Column 20, Line 35, please delete "9,11" and insert -- 9, 11 --

In Claim 5, Column 21, Line 13, please delete "Δ" and insert -- λ --

In Claim 6, Column 21, Line 16, please delete "based" and insert -- based on --

In Claim 11, Column 21, Line 67, please delete "{3, 6, 7, 9,11, 13, 13,1.4" and insert -- {3, 6, 7, 9, 11, 13, 14}, --

In Claim 11, Column 22, Line 2, please delete "9,11" and insert -- 9, 11 --

In Claim 11, Column 22, Line 3, please delete ")" and insert -- } --

In Claim 12, Column 22, Line 12, please delete "xi" and insert -- $x_i$ --

In Claim 12, Column 22, Line 21, please delete "xi" and insert -- $x_i$ --

In Claim 15, Column 22, Line 45, please delete "Δ" and insert -- λ --

Signed and Sealed this
Sixth Day of December, 2022

*Katherine Kelly Vidal*
Katherine Kelly Vidal
*Director of the United States Patent and Trademark Office*